United States Patent [19]

Marey et al.

[11] 3,916,436

[45] Oct. 28, 1975

[54] METHOD AND ARRANGEMENT FOR THE TRANSMISSION OF SIGNALS IN A COLOR TELEVISION SYSTEM

[75] Inventors: Mohamed Marey, Gross-Gerau; Klaus Pöllath, Rossdorf, both of Germany

[73] Assignee: Robert Bosch Fernsehanlagen GmbH, Darmstadt, Germany

[22] Filed: Aug. 8, 1973

(Under Rule 47)

[21] Appl. No.: 386,251

[30] Foreign Application Priority Data

Aug. 9, 1972 Germany .......................... 2239096

[52] U.S. Cl. ............... 358/1; 178/5.6; 178/DIG. 23

[51] Int. Cl.$^{2}$ ........................................ H04N 9/02

[58] Field of Search ....... 178/5.6 R, 5.8 R, DIG. 13, 178/DIG. 23, DIG. 30, 5.2 R, 5.4 R; 358/1

[56] References Cited

UNITED STATES PATENTS

| | | | |
|---|---|---|---|
| 2,671,130 | 3/1954 | Weighton et al. | 178/5.6 |
| 2,978,538 | 4/1961 | Breese | 178/DIG. 23 |
| 3,215,774 | 11/1965 | Ikegami | 178/DIG. 23 |
| 3,391,247 | 7/1968 | Frohbach | 178/5.8 |
| 3,440,342 | 4/1969 | Beltrami | 178/DIG. 23 |
| 3,493,674 | 2/1970 | Houghton | 178/DIG. 23 |
| 3,752,907 | 8/1973 | Mazza | 178/DIG. 23 |

*Primary Examiner*—Richard Murray
*Attorney, Agent, or Firm*—Michael S. Striker

[57] ABSTRACT

A color television camera is comprised of a unit for generating picture signals, a unit for generating a plurality of control signals respectively indicative of different camera operating conditions, and a unit for generating an audio signal. A camera control unit for the color television camera is comprised of a unit for generating synch signals for controlling the scanning operation of the camera, a unit for generating control signals to be transmitted to the camera to control additional camera operations, and a unit for generating an audio signal to be transmitted to the camera. A single coaxial cable interconnects the color television camera and the control unit for the color television camera. A first modulating unit at the control unit is operative for transmitting to the camera via the single coaxial cable all of the control signals to be transmitted from the control unit to the camera in the form of at least one modulated carrier signal. A second modulating unit at the camera is operative for transmitting to the control unit via the single coaxial cable all of the control signals to be transmitted from the camera to the control unit in the form of at least one modulated carrier signal. A first demodulating unit at the control unit for the camera is operative for demodulating the modulated carrier signal transmitted to the control unit from the camera. A second demodulating unit at the camera is operative for demodulating the carrier signal transmitted to the camera from the control unit. At least one of the first and second demodulating units is operative for transmitting at least some of the control signals in the form of at least one modulated carrier signal only during the intervals between the transmission of picture signals corresponding to the vertical blanking period of the operation of the camera.

20 Claims, 3 Drawing Figures

METHOD AND ARRANGEMENT FOR THE TRANSMISSION OF SIGNALS IN A COLOR TELEVISION SYSTEM

BACKGROUND OF THE INVENTION

The invention relates to the transmission of information on modulated carriers back and forth between a color television camera and a separate camera control unit connected to the color television camera by a single coaxial cable.

With many color television camera constructions, and particularly with highly portable color television cameras of the type used by newsmen in covering news events, it is desired to keep the color television camera as small and simple as possible. For this reason many components which could be included in the camera construction and circuitry itself are located in a separate control unit which is connected to the camera by means of cables. A great deal of information must be transmitted by means of such cables back and forth between the camera and the control unit. In addition to the video information which must be transmitted from the camera to the control unit and the synchronization information which must be transmitted from the control unit to the camera, it is often necessary to additionally transmit back and forth still further information. For instance, if a monitor is provided at the location of the control unit, to monitor the image produced by the camera, an operator located at the control unit may wish to perform adjustments of the camera operation, for instance by varying the focal distance of the lens system of the camera, by placing appropriate filters in the optical path of the camera optical system, and so forth. Such camera control signals have to be transmitted from the control unit to the camera, and as will be appreciated, many different kinds of signals may be involved, depending upon the number and kind of camera operations to be remotely controlled from the control unit.

Moreover, there are additional signals which must be transmitted from the camera to the control unit, for example so-called answerback signals. After the control unit transmits to the camera a signal to adjust a camera operation, it is known to transmit back to the control unit a signal indicating that the desired adjustment of the camera operation has been performed. In addition, the operator at the camera control unit may wish to communicate orally with the newsman at the camera. Also, a viewfinder signal may be transmitted from the control unit to the camera for the cameraman's benefit.

In view of the number of different kinds of information which must be transmitted back and forth between the color television camera and the control unit, it is conventional practice to connect the television camera and the control unit by means of a multi-conductor cable, with the number of conductors contained in the cable being sufficiently large to permit separate transmission of all the different signals and kinds of information involved back and forth between the camera and the control unit. The number of conductors which such a cable must ordinarily have results in a cable having a relatively large diameter and accordingly an inconvenient degree of stiffness and bulk. Especially when the cameras involved are of the hand-held type used by newsmen, the inconvenience caused by a thick and stiff connecting cable can be substantial. This is most particularly inconvenient if the connecting cable is very long, for example several hundred feet or several hundred yards long.

To avoid this disadvantage, it has been proposed (in German Offenlegungsschrift No. 1,816,746) to devise a method of transmitting information back and forth between a black-and-white television camera and the control unit of the camera of such a nature as to permit the use of a single coaxial cable for interconnecting the control unit and the camera. According to that prior-art proposal, the black-and-white video information is transmitted in its usual frequency band, while the control signals and audio signals are modulated onto suitable carriers, to permit their simultaneous transmission over the single coaxial connecting cable.

Additionally, it is known (Journal of the S.M.P.T.E., November 1970, pp. 1003–1008) to provide a color television camera in which the different video signals are transmitted, modulated upon respective carriers, over a single coaxial cable.

With the known methods of transmitting information back and forth between the television camera and the control unit, the energy source to which the camera and/or control unit must be connected is a D.C. source. This D.C. source voltage must be converted, both in the control unit and also in the camera proper, into various supply voltages, and such conversion has proven relatively inconvenient and expensive. Also, with the known methods of transmitting the requisite information and signals back and forth between the camera and control unit a substantial amount of interference results from the simultaneous transmission of the several modulated carriers.

SUMMARY OF THE INVENTION

It is accordingly the general object of the present invention to overcome the disadvantages of the known methods and systems.

It is a more specific object to provide a novel method for transmitting video and audio information and control signals back and forth between a color television camera and the control unit for the camera, using only a single coaxial cable for connecting the camera to the control unit, without incurring the disadvantages of known methods and systems for this purpose.

Still more specifically, it is an object to provide a method and system for the transmission of such information and signals which does not give rise to poor signal-to-noise ratios, signal attenuation and signal distortion to the extent to which such disadvantages characterize the prior art.

These objects, and others which will become more understandable from the following description of a specific embodiment, can be met by providing in combination with a color television camera comprised of means for generating picture signals and comprised of means for generating a plurality of control signals respectively indicative of different camera operating conditions and comprised of means for generating an audio signal, and further in combination with a control unit for the color television camera comprised of means for generating synch signals for controlling the scanning operation of the camera and comprised of means for generating control signals to be transmitted to the camera to control additional camera operations and further comprised of means for generating an auio signal to be transmitted to the camera, a novel connecting system for interconnecting the camera and the control unit, comprising, a single coaxial cable having a first end and a second end; first modulating means connecting said first end of said coaxial cable to said control unit and operative for transmitting to said camera via said single coaxial cable all of the control signals to be transmitted from said control unit to said camera in the form of at least one modulated carrier signal; second modulating means connecting said second end of said coaxial cable to said camera and operative for transmitting to said control unit via said single coaxial cable all of the control signals to be transmitted from said camera to said control unit in the form of at least one modulated carrier signal; first demodulating means at said control unit operative for demodulating the modulated carrier signal transmitted to said control unit from said camera; and second demodulating means at said camera operative for demodulating the modulated carrier signal transmitted to said camera from said control unit, at least one of said first and second modulating means comprising means operative for transmitting at least some of said control signals in the form of at least one modulated carrier signal only during the intervals between the transmission of picture signals corresponding to the vertical blanking period of the operation of the camera.

In addition, the invention contemplates a method of transmitting a predetermined signal, especially an audio signal, simultaneously with the transmission of a composite television picture signal comprised of video information and horizontal synch pulses, comprising the step of pulse-amplitude-modulating said predetermined signal onto at least a portion of at least some of the horizontal synch pulses of said composite television picture signal.

The novel features which are considered characteristic for the invention are set forth in particular in the appended claims. The invention itself, however, both as to its construction and its method of operation will be best understood from the following description of specific embodiments when read in connection with the accompanying drawing.

DESCRIPTION OF A PREFERRED EMBODIMENT

Figure 1:
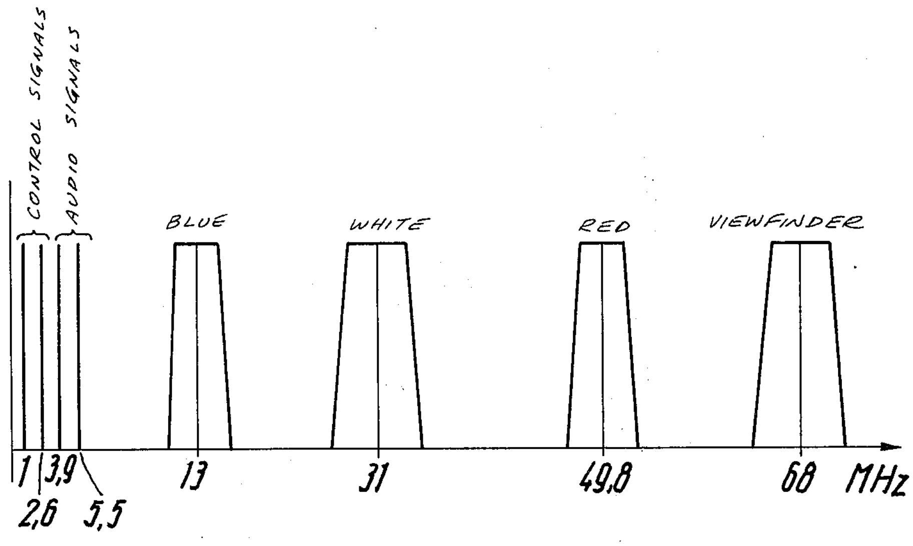
FIG. 1 is a graphical depiction of the spectral distribution of the information and signals transmitted back and forth between the color television camera and the control unit for the color television camera.

In the spectral distribution depicted in FIG. 1, the carrier frequencies are indicated as vertical lines. The digital signals for the control of and answerback from the camera are here transmitted with a carrier frequency of 1 MHz to the control unit, and the control signals from the control unit to the camera are transmitted wiht a carrier frequency of 2.6 MHz, in the vertical blanking pauses of the video signal with amplitude modulation.

The audio signals from the camera 3 to the control unit 2 are transmitted with a carrier frequency of 3.9 MHz. On the 5.5 MHz carrier frequency there is transmitted with amplitude modulation the horizontal synch pulses with fixed phase and in the trailing part of these horizontal synch pulses the audio signal with pulse-amplitude-modulation. The color video signals blue, white and red are amplitude-modulated onto carrier frequencies of 13 MHz, 31 MHz and 49.8 MHz and transmitted from the camera to the control unit. Finally, the external viewfinder signal from the control unit to the camera is transmitted as an amplitude modulated signal having a carrier frequency of 68 MHz.

The thusly selected spectral distribution of the video signals represents an optimal distribution for the transmission. With increasing frequency the attenuation of the signals increases, i.e., the signal-to-noise ratio worsens; on the other hand, with decreasing frequency the phase or group velocity error increases, i.e., there is a decrease in resolution. With this in mind, the carrier frequency for the most important signal, namely the white picture signal, is selected generally in the middle of the employed frequency range. The carrier frequencies for the blue and red picture signals (with respect both to carrier frequency and bandwidth) are selected above and below the carrier frequency of the white picture signal. Inasmuch as the viewfinder signal is an internal signal, and inasmuch as the attenuation of the viewfinder signal does not pose a serious problem, in so far as actual transmission of a television picture from the camera is concerned, the carrier frequency for the viewfinder signal is selected relatively high. With this optimal selection of carrier frequencies, the bandwidths of the various picture signals can be fairly large, without the various picture signals interfering with each other; the bandwidth for white can be greater than 6 MHz, for red greater than 5 MHz, for blue greater than 4 MHz and for the viewfinder signal greater than 6 MHz.

The energy supply for the color television camera is the conventional 220 V 50 Hz A.C. voltage of Europe. Clearly, the camera can be modified for other supply voltages.

Figure 2:
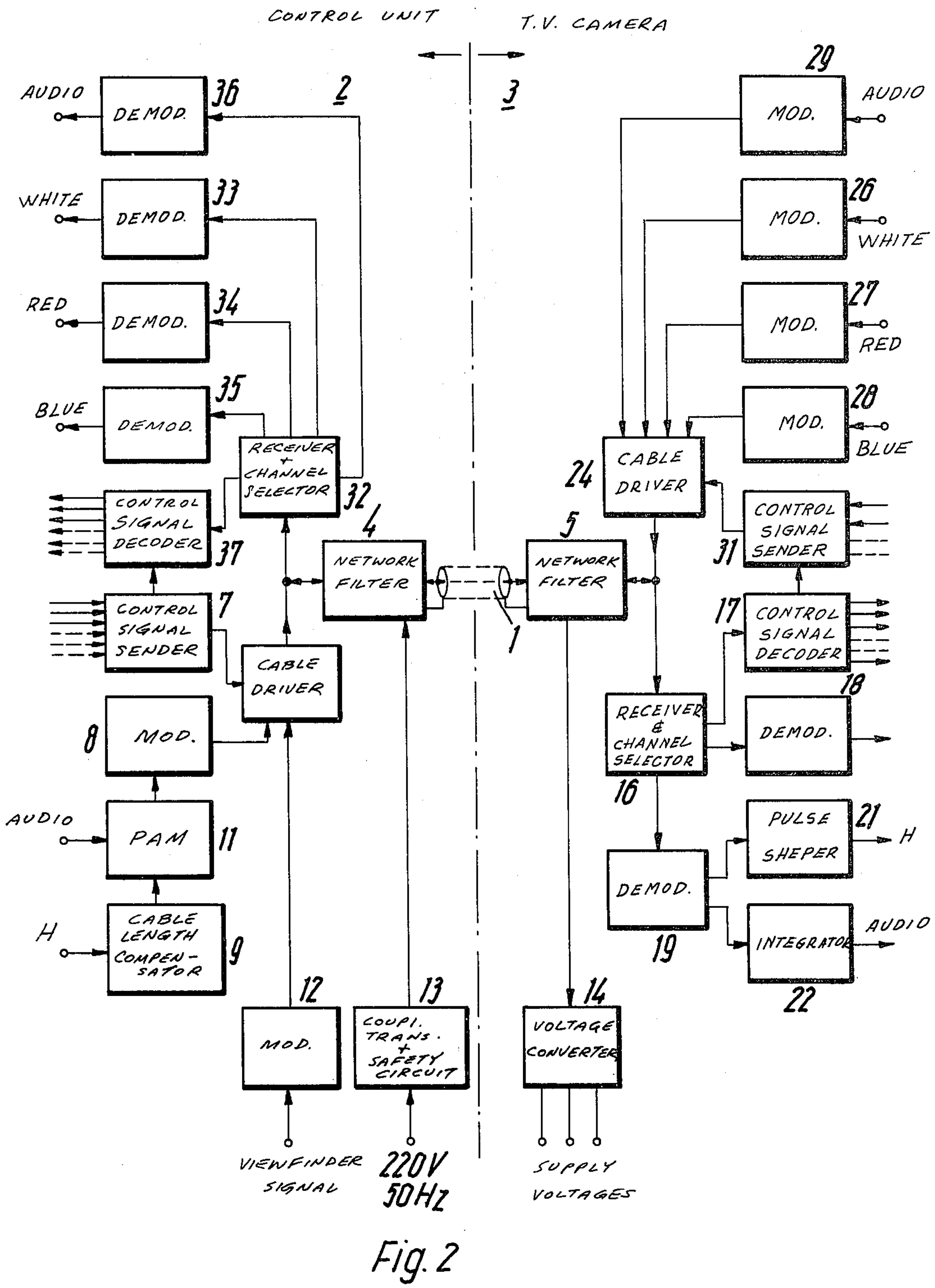
FIG. 2 is a functional block diagram of the interface between a color television camera and the control unit for the color television camera.

FIG. 2 depicts in functional block form the interface between the camera 3 and the camera control unit 2 showing the components necessary for the transmission of all the necessary signals back and forth between camera 3 and control unit 2 over a single coaxial transmission cable 1. Connected to each end of the coaxial cable 1 is a network filter 4 or 5 which have the purpose of separating the low-frequency supply voltage from the high-frequency signals, and of permitting mixing of the low-frequency supply voltage and the high-frequency signals.

At the camera control unit 2, a cable driver stage 6 transmits through the network filter 4 to the coaxial cable 1 digital control signals for the control of various camera functions, such as registration, objective adjustment, filter selection, etc. These signals are derived from a digital signal generator 7 which encodes the signals resulting from manual activation of camera functions by the operator of the camera control unit 2. The generation of such control signals per se is conventional, and need not be described in detail.

The horizontal synch pulses for the control of the scanning operation of the camera 3 are generated at the camera control unit 2 in a conventional and non-illustrated manner. These horizontal synch pulses, designated H, are applied to a stage 9, which is preset in accordance with the length of the coaxial cable 1, to effect the necessary phase correction. The phase-corrected horizontal synch pulses H appearing at the output of phase corrector 9 are applied to a conventional pulse-amplitude-modulating stage 11 which amplitude modulates the horizontal synch pulses H with the audio information to be transmitted from the camera control unit 2 to the camera 3. Such audio information may represent oral instructions which the operator at the camera control unit 2 wishes to give to the newsman holding the camera 3.

In particular, the pulse-amplitude-modulator 11 pulse-amplitude-modulates the audio signal onto only the trailing portions of the horizontal synch pulses H, leaving the leading portions of the synch pulses H unaffected, in order not to interfere with the synchronizing effect of the horizontal synch pulses H. This pulse-amplitude-modulation of only the trailing portions of the horizontal synch pulses H is effected by providing a monostable multivibrator at the input of the pulse-amplitude-modulator 11. The duration of the pulse generated by the monostable multivibrator is equal to the duration of the leading portion of the horizontal synch pulse not to be pulse-amplitude-modulated.

When the horizontal synch pulse H is applied to the input of pulse-amplitude-modulator 11, the leading edge of the synch pulse H triggers the (non-illustrated) monostable multivibrator. During the unstable state of the (non-illustrated) monostable multivibrator, the output pulse of the multivibrator generates a gating signal permitting the passage of the horizontal synch pulse H directly to the output of pulse-amplitude modulator 11 via a (non-illustrated) bypass conductor gated by the (non-illustrated) monostable multivibrator just mentioned. However, at the end of the unstable state of the monostable multivibrator, the gating signal permitting passage of the horizontal synch pulse H directly to the output of pulse-amplitude-modulator 11 terminates, so that the trailing portion of the synch pulse H can no longer pass directly to the output of the modulator 11. The trailing portion of the synch pulse H is pulse-amplitude-modulated in dependence upon the value of the audio signal at this time, and the thusly pulse-amplitude-modulated trailing portion of the synch pulse is passed to the output of the modulator 11 in pulse-amplitude-modulated form.

The horizontal synch pulses H, unmodulated at their leading portions and pulse-amplitude-modulated at their trailing portions, are applied to an amplitude modulator 8 which impresses the pulse-amplitude-modulated synch pulses H onto a 5.5 MHz A.C. carrier signal, which is transmitted to camera 3 via coaxial cable 1 via cable driver stage 6.

Also transmitted from the camera control unit 2 to the camera 3 via the coaxial cable 1, the network filter 4 and cable driver 6 is a conventional viewfinder signal. The viewfinder signal is applied to the input of an amplitude modulator 12 which impresses the viewfinder signal onto a 68 MHz carrier.

The 220 V 50 Hz A.C. supply voltage is applied to a coupling stage 13. The coupling stage 13 is comprised of a coupling transformer having a primary connectible across the mains voltage and having a secondary connected across an input of the network filter 4. The network filter 4 permits passage of this low-frequency supply voltage in direction from the control unit 2 to the camera 3. The network filter 5 at the camera 3 separates the low-frequency supply voltage from the high-frequency carrier signals and applies the low-frequency supply voltage to a supply device 14, comprised of appropriate step-down transformers, rectifiers and filters, which generate the requisite supply voltages for the camera circuitry.

The coupling unit 13 is provided wtih protective means. A voltage-responsive device is connected across the primary of the coupling transformer; when the primary voltage reaches a predetermined value, the flow of primary current is greatly reduced in an automatic safeguarding operation. A current-responsive device monitors the current flowing in the primary of the coupling transformer, and when such primary current exceeds a predetermined value, the current-responsive device greatly reduces the primary current magnitude.

The modulated carriers transmitted from the control unit 2 to the camera 3 are separated by filter means 5 from the low-frequency supply voltage, and applied to a receiver and selection stage 16 which separates the different carriers on the basis of their different frequencies; the selection stage 16 can be comprised of suitable bandpass filters for effecting this separation of carriers. The digital control signals are separated by selection stage 16 from the other transmitted signals and applied to a digital receiving circuit 17 which demodulates and decodes the digital control signals, and thereupon energizes appropriate output lines to control various camera functions.

Likewise, selection stage 16 separates out the carrier modulated wtih the viewfinder signal and applies this signal to a demodulator 18, and the recovered viewfinder signal is applied to the camera viewfinder. Likewise, the pulse-amplitude-modulated horizontal synch pulses impressed upon an amplitude-modulated carrier are separated out by selection stage 16 and applied to a demodulator 19 which recovers the pulse-amplitude-modulated horizontal synch pulses. The pulse-amplitude-modulated synch pulses are applied to a pulse-shaping stage 21 which regenerates the horizontal synch pulses H. The pulse-amplitude-modulated trailing portions of the synch pulses H are applied to an integrator 22 which effects demodulation of the pulse-amplitude-modulated synch pulses, thereby recovering the modulating audio signal.

At the camera side of the coaxial cable 1, the camera audio signal is amplitude modulated by modulator 29 onto a 3.9 MHz carrier, the white picture signal is amplitude modulated by amplitude modulator 26 onto a 31 MHz carrier, the red picture signal is amplitude modulated by amplitude modulator 27 onto a 49.8 MHz carrier, and the blue picture signal is amplitude modulated by amplitude modulator 28 onto a 13 MHz carrier. Finally, a digital signal transmitter unit 31 amplitude modulates a plurality of digital control signals onto a 1 MHz carrier. These five amplitude-modulated carrier signals are applied to a cable driver 24, which transmits these amplitude-modulated carrier signals over the coaxial cable 1 to the camera control unit 2. These five amplitude-modulated carriers are passed by network filter 4 and transmitted to a receiving and selecting stage 32 which separates the five carriers and applies them to respective demodulating stages 36, 33, 34, 35 and 37. After demodulation of the various carriers, the respective picture, audio and control signals are recovered and transmitted to the appropriated (non-illustrated) functional units of the camera control unit 2.

Figure 3:
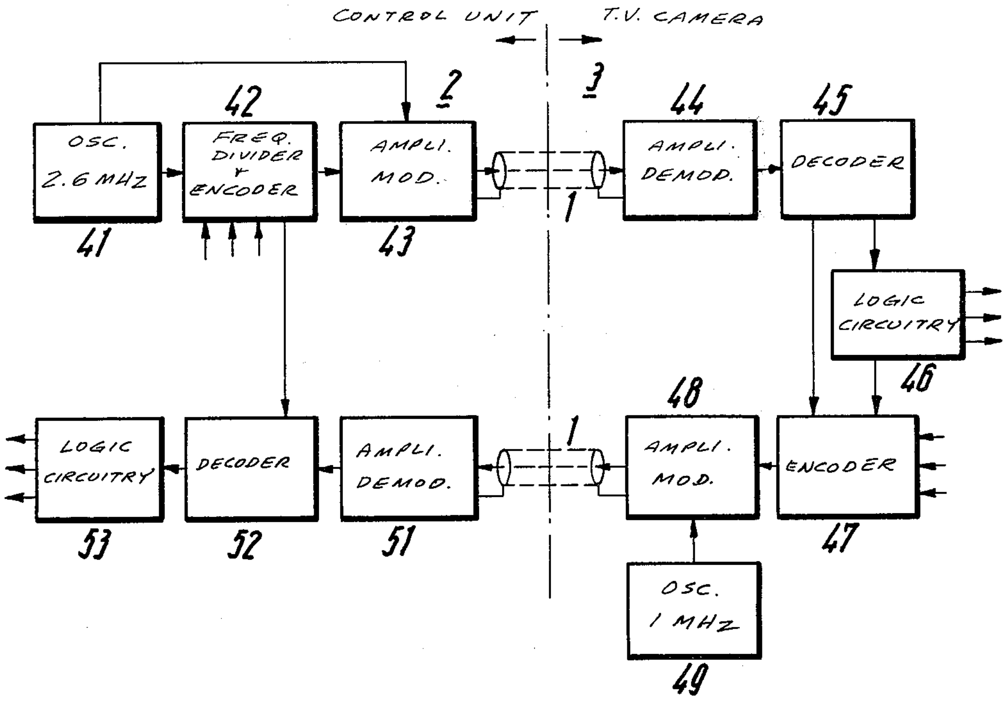
FIG. 3 shows in somewhat greater detail, in functional block form, portions of the interface depicted in FIG. 2.

FIG. 3 depicts in somewhat greater detail certain portions of the interface depicted in functional block form in FIG. 2. For the sake of clarity, the network filters 4 and 5, and the cable driver stages 6 and 24, and the receiving and selection stages 16 and 32, have been omitted. Also, for the sake of clarity, and because of the omission of the filters 4, 5, the camera control unit 2 and camera 3 are shown connected to each other by two coaxial cables, one for the transmission of signals from control unit 2 to camera 3, and another coaxial cable for transmission of signals from the camera 3 to the control unit 2.

The arrangement for generating the digital control signals comprises a clock signal generator in the form of an oscillator 41 generating a 2.6 MHz signal, an encoding stage 42 for suitable encoding the digital control signals. In particular the incoming control signals are made to control a frequency-dividing stage 42 to produce pulse -duration-modulated pulses distinguishable from each other. The control signals are thereupon amplitude-modulated upon a 2.6 MHz carrier by amplitude modulator 43. This modulated carrier is transmitted by cable 1 to the amplitude demodulator 44 of the camera installation 3. The signals recovered by amplitude demodulator 44 are applied to demodulating decoder 45 which causes digital signal generator 46 transmit control signals to different functional blocks of the camera 3. The recovered and decoded signals received by camera 3 from control unit 2 are subsequently recoded and remodulated onto a 1 MHz carrier and transmitted back to the control unit 2 as an answerback signal. These signals are transmitted to amplitude demodulator 51, and the recovered control signals are decoded by decoder 52 and applied to a stage 53 having various outputs connected to different (non-illustrated) functional groups within the camera control unit 2.

It is to be understood that the transmission of these control signals from camera control unit 2 to camera 3, and vice versa, occurs only during the time intervals between the transmission of picture signals corresponding to the vertical blanking period of the operation of the television camera and/or the vertical blanking period of the transmission of the viewfinder signal from the control unit 2 to the camera 3. Non-illustrated means capable of detecting the vertical blanking period is connected to the output of modulator 43 and prevents the transmission of the 2.6 MHz carrier except during the vertical blanking period. Likewise, further non-illustrated means capable of detecting the vertical blanking period is connected to the oscillator 49 of FIG. 3 and prevents operation of this oscillator except during the vertical blanking period. By transmitting the control signals only during the time intervals corresponding to the vertical blanking period the transmitted control signals are not confused with and do not interfere with the quality of the transmitted picture signals. It will be appreciated that in FIG. 3 components 51–53 correspond to component 37 in FIG. 2. Components 41–43 in FIG. 3 corresponds to block 7 in FIG. 2. Components 47–49 in FIG. 3 correspond to block 31 in FIG. 2, and components 44–46 in FIG. 3 correspond to block 17 in FIG. 2.

It will be understood that each of the elements described above, or two or more together, may also find a useful application in other types of circuits and constructions differing from the types described above.

While the invention has been illustrated and described as embodied in an interface circuit for the interconnection of a color television camera and a control unit for the camera, it is not to be considered limited to the specific details shown, since various modifications and structural and circuit changes may be made without departing in any way from the spirit and concept of the present invention.

Without further analysis, the foregoing will so fully reveal the gist of the present invention that others can be applying current knowledge readily adapt it for various applications without omitting features that from the standpoint of prior art fairly constitute essential characteristics of the generic or specific aspects of the invention and, therefore, such modifications should and are intended to be comprehended within the meaning and range of equivalence of the following claims.

What is claimed as new and desired to be protected by Letters Patent is set forth in the appended claims:

1. A method of transmitting a predetermined signal simultaneously with the transmission of a composite television picture signal comprised of video information and horizontal synch pulses each having a leading end portion and a trailing end portion, comprising the step of pulse-amplitude-modulating said predetermined signal onto only one of said two end portions of at least some of the horizontal synch pulses of said composite television picture signal, while not modulating the other of the two end portions of the modulated ones of the horizontal synch pulses, whereby to assure that the pulse-amplitude-modulated ones of the horizontal synch pulses retain their synchronizing effect.

2. A method as defined in claim 1, wherein said step of pulse-amplitude-modulating comprises pulse-amplitude-modulating comprises pulse-amplitude-modulating an audio signal onto all of the horizontal synch pulses of said composite television picture signal.

3. A method as defined in claim 1, wherein said step of pulse-amplitude-modulating comprises pulse-amplitude-modulating an audio signal onto only the trailing end portions of predetermined ones of the horizontal synch pulses of said composite picture signal.

4. A method as defined in claim 1, wherein said step of pulse-amplitude-modulating comprises pulse-amplitude-modulating an audio signal onto only the trailing end portions of all of the horizontal synch pulses of said composite television picture signal.

5. A method as defined in claim 1, wherein said step of pulse-amplitude-modulating comprises pulse-amplitude-modulating an audio signal.

6. In combination with a color television camera comprised of means for generating picture signals, means for generating a plurality of control signals respectively indicative of different camera operating conditions and means for generating an audio signal, and further in combination with a control unit for the color television camera comprised of means for generating synch signals for controlling the scanning operation of the camera, means for generating control signals to be transmitted to the camera to control additional camera operations and means for generating an audio signal to be transmitted to the camera, a novel connecting system for interconnecting the camera and the control unit, comprising a single coaxial cable having a first end and a second end; first modulating means connecting said first end of said coaxial cable to said control unit and operative for transmitting to said camera via said single coaxial cable all of the control signals to be transmitted from said control unit to said camera in the form of at least one modulated carrier signal; second modulating means connecting said second end of said coaxial cable to said camera and operative for transmitting to said control unit via said single coaxial cable all of the control signals to be transmitted from said camera to said control unit in the form of at least one modulated carrier signal; first demodulating means at said control unit operative for demodulating the modulating the modulated carrier signal transmitted to said control unit from said camera; and second demodulating means at said camera operative for demodulating the modulated carrier signal transmitted to said camera from said control unit, at least one of said first and second modulating means comprising means operative for transmitting at least some of said control signals in the form of at least one modulated carrier signal only during the intervals between the transmission of picture signals corresponding to the vertical blanking period of the operation of the camera, wherein said means for transmitting at least some of said control signals in the form of at least one modulated carrier signal only during the intervals corresponding to the vertical blanking period comprises means for generating and transmitting a control signal in the form of a pulse-duration-modulated carrier signal impressed upon an amplitude-modulated carrier signal.

7. The combination defined in claim 6, wherein both said first and said second modulating means comprise means for transmitting at least some of said control signals in the form of modulated carrier signals only during the intervals between the transmission of picture signals corresponding to the vertical blanking period of the operation of the camera.

8. The combination defined in claim 6, wherein both said first and said modulating means comprise means for transmitting at least some of said control signals in the form of pulse-duration-modulated carrier signals only during the intervals between the transmission of picture signals corresponding to the vertical blanking period of the operation of the camera.

9. In combination with a color television camera comprised of means for generating picture signals, means for generating a plurality of control signals respectively indicative of different camera operating conditions and means for generating an audio signal, and further in combination with a control unit for the color television camera comprised of means for generating synch signals for controlling the scanning operation of the camera, means for generating control signals to be transmitted to the camera to control additional camera operations and means for generating an audio signal to be transmitted to the camera, a novel connecting system for interconnecting the camera and the control unit, comprising a single coaxial cable having a first end and a second end; first modulating means connecting said first end of said coaxial cable to said control unit and operative for transmitting to said camera via said single coaxial cable all of the control signals to be transmitted from said control unit to said camera in the form of at least one modulated carrier signal; second modulating means connecting said second end of said coaxial cable to said camera and operative for transmitting to said control unit via said single coaxial cable all of the control signals to be transmitted for said camera to said control unit in the form of at least one modulated carrier signal; first demodulating means at said control unit operative for demodulating the modulated carrier signal transmitted to said control unit from said camera; and second demodulating means at said camera operative for demodulating the modulated carrier signal transmitted to said camera from said control unit, at least one of said first and second modulating means comprising means operative for transmitting at least some of said control signals in the form of at least one modulated carrier signal only during the intervals between the transmission of picture signals corresponding to the vertical blanking period of the operation of the camera, wherein said first modulating means comprises first pulse-duration-modulating means and first amplitude-modulating means together operative only during the intervals between the transmission of picture signals corresponding to the vertical blanking period of the operation of the camera for converting at least one of the control signals to be transmitted from said control unit to said camera into the form of a pulse-duration-modulated carrier signal impressed upon an amplitude-modulated carrier signal having a first frequency, and wherein said second modulating means comprises second pulse-duration-modulating means and second amplitude-modulating means together operative only during the intervals between the transmission of picture signals corresponding to the vertical blanking period of the operation of the camera for converting at least one of the control signals to be transmitted from said camera to said control unit into the form of a pulse-duration-modulated carrier signal impressed upon an amplitude-modulated carrier signal having a second frequency different from said first frequency.

10. The combination defined in claim 9, wherein both said first frequency and said second frequency are lower than 5 MHz.

11. The combination defined in claim 10, wherein said second modulating means comprises means for amplitude-modulating said picture signals onto a plurality of respective A.C. carriers having respective frequencies above 10 MHz and means for transmitting such amplitude-modulated carriers to said control unit via said single coaxial cable.

12. The combination defined in claim 11, wherein said second modulating means further comprises means for transmitting said audio signal to said control unit in the form of an amplitude-modulated carrier signal.

13. The combination defined in claim 12, said control unit being further comprised of means for generating an additional audio signal to be transmitted to said camera and means for generating horizontal synch pulses to be transmitted to said camera, and wherein said first modulating means comprises means for pulse-amplitude-modulating said additional audio signal onto at least a predetermined portion of at least predetermined ones of the horizontal synch pulses to be transmitted to said camera and means for amplitude-modulating the pulse-amplitude-modulated horizontal synch pulses onto an A.C. carrier and transmitting such A.C. carrier to said camera via said single coaxial cable.

14. The combination defined in claim 13, wherein the frequencies of the amplitude-modulated A.C. carriers onto which said audio signal and said horizontal synch signal are amplitude-modulated are higher than said first and second frequencies but lower than the frequencies of the amplitude-modulated A.C. carriers onto which said picture signals are amplitude-modulated.

15. The combination defined in claim 14, wherein said means for pulse-amplitude-modulating said additional audio signal onto at least a predetermined portion of at least predetermined ones of the horizontal synch pulses to be transmitted to said camera comprises means for thusly pulse-amplitude-modulating only the trailing portions of such horizontal synch pulses, whereby to leave unaffected the leading portions of such horizontal synch pulses so as not to interfere with the synchronizing effect of such horizontal synch pulses.

16. The combination defined in claim 14, wherein at least one of said first and second pulse-duration -modulating means comprises means for generating an A.C. signal and frequency-divider means for dividing the frequency of such A.C. signal in such a manner as to produce a pulse-duration-modulated carrier.

17. The combination defined in claim 14; and further comprising means at said camera unit operative for transmitting back to said control unit in the form of a further modulated carrier signal the control signals resulting from demodulation of the modulated carrier signal received by said second demodulating means.

18. The combination defined in claim 14; and further comprising means for transmitting a low frequency A.C. supply voltage to said camera via said single coaxial cable, and filter means at said camera for separating said low frequency A.C. supply voltage from high frequency signals transmitted to said camera from said control unit.

19. The combination defined in claim 18, wherein said means for transmitting a low frequency A.C. supply voltage comprises a coupling transformer having a secondary connected to said coaxial cable and a primary connectable to a source of low frequency voltage, and means for reducing the flow of current in said primary when the voltage across said primary reaches a predetermined value and for reducing the flow of current in said primary when the current through said primary exceeds a predetermined value.

20. In combination with a color television camera comprised of means for generating picture signals, means for generating a plurality of control signals respectively indicative of different camera operating conditions and means for generating an audio signal, and further in combination with a control unit for the color television camera comprised of means for generating synch signals for controlling the scanning operation of the camera, means for generating control signals to be transmitted to the camera to control additional camera operations and means for generating an audio signal to be transmitted to the camera, a novel connecting system for interconnecting the camera and the control unit, comprising a single coaxial cable having a first end and a second end; first modulating means connecting said first end of said coaxial cable to said control unit and operative for transmitting to said camera via said single coaxial cable all of the control signals to be transmitted from said control unit to said camera in the form of at least one modulated carrier signal; second modulating means connecting said second end of said coaxial cable to said camera and operative for transmitting to said control unit via said single coaxial cable all of the control signals to be transmitted from said camera to said control unit in the form of at least one modulated carrier signal; first demodulating means at said control unit operative for demodulating the modulated carrier signal transmitted to said control unit from said camera; and second demodulating means at said camera operative for demodulating the modulated carrier signal transmitted to said camera from said control unit, at least one of said first and second modulating means comprising means operative for transmitting at least some of said control signals in the form of at least one modulated carrier signal only during the intervals between the transmission of picture signals correspondong to the vertical blanking period of the operation of the camera, wherein said means for transmitting at least some of said control signals in the form of at least one modulated carrier signal only during the intervals corresponding to the vertical blanking period comprises means for generating and transmitting a control signal in the form of a pulse-duration-modulated carrier signal impressed upon a further modulated carrier signal.

* * * * *

UNITED STATES PATENT AND TRADEMARK OFFICE

CERTIFICATE OF CORRECTION

PATENT NO. : 3,916,436

DATED : October 28, 1975

INVENTOR(S) : Mohamed Marey et al.

It is certified that error appears in the above–identified patent and that said Letters Patent are hereby corrected as shown below:

On page 1, beneath the Abstract, cancel the drawing (which does not belong to this patent) and substitute the drawing as shown on the attached sheet.

Signed and Sealed this

Tenth Day of August 1976

[SEAL]

*Attest:*

RUTH C. MASON
*Attesting Officer*

C. MARSHALL DANN
*Commissioner of Patents and Trademarks*

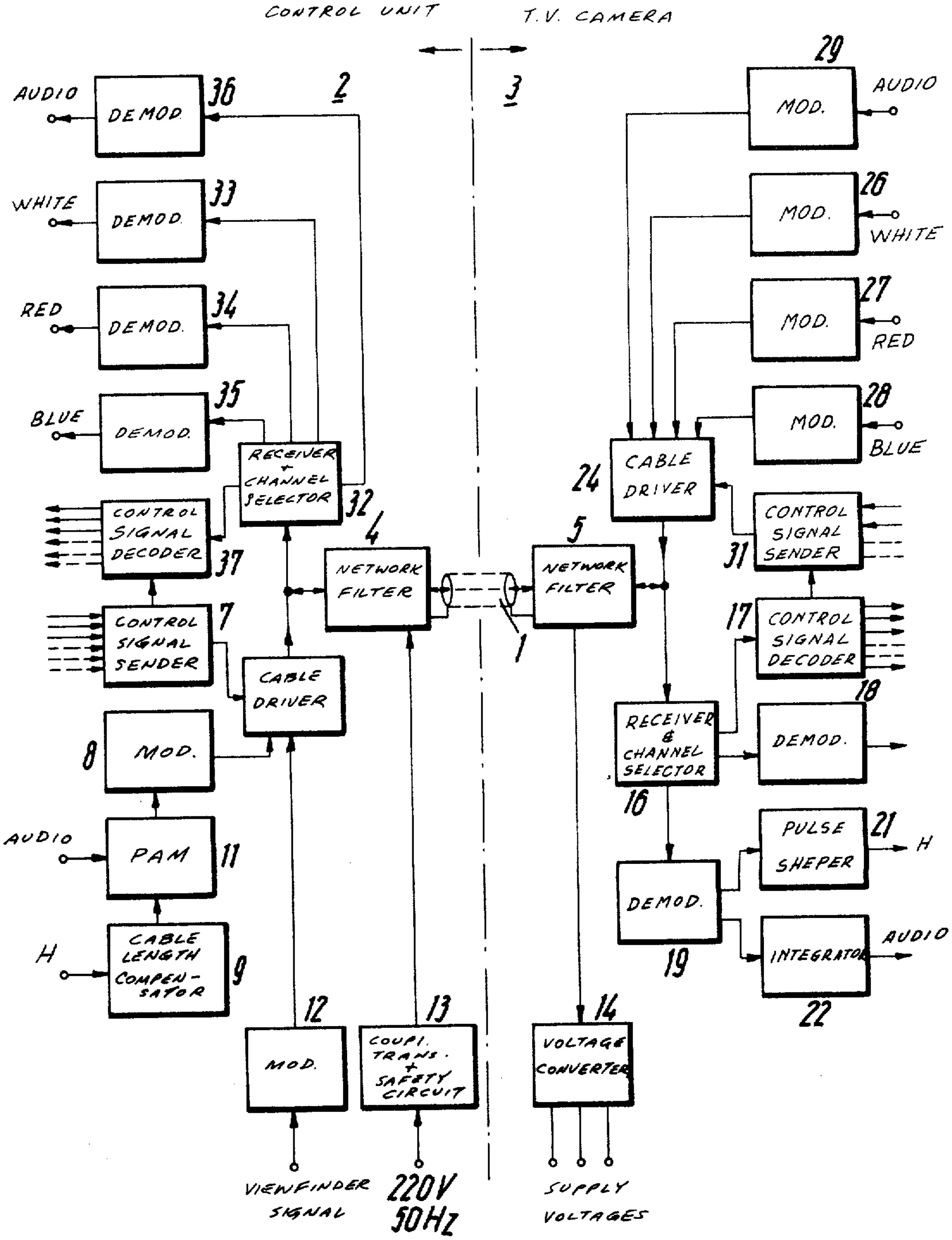
CONTROL UNIT
T.V. CAMERA
2
3
AUDIO
DEMOD
36
WHITE
DEMOD.
33
RED
DEMOD.
34
BLUE
DEMOD.
35
RECEIVER + CHANNEL SELECTOR
32
CONTROL SIGNAL DECODER
37
CONTROL SIGNAL SENDER
7
NETWORK FILTER
4
CABLE DRIVER
MOD.
8
AUDIO
PAM
11
H
CABLE LENGTH COMPENSATOR
9
MOD.
12
COUPL. TRANS. + SAFETY CIRCUIT
13
VIEWFINDER SIGNAL
220V 50Hz
1
NETWORK FILTER
5
MOD.
29
AUDIO
MOD.
26
WHITE
MOD.
27
RED
MOD.
28
BLUE
CABLE DRIVER
24
CONTROL SIGNAL SENDER
31
CONTROL SIGNAL DECODER
17
RECEIVER & CHANNEL SELECTOR
16
DEMOD.
18
PULSE SHEPER
21
H
DEMOD.
19
INTEGRATOR
AUDIO
22
VOLTAGE CONVERTER
14
SUPPLY VOLTAGES